Oct. 25, 1949.  J. L. LEFLER ET AL  2,485,753
FLUID PRESSURE DEVICE

Filed Feb. 11, 1946  2 Sheets-Sheet 1

INVENTOR.
J. L. LEFLER
J. E. LEININGER
BY
E. Woodbury
ATTORNEY

Oct. 25, 1949.    J. L. LEFLER ET AL    2,485,753
FLUID PRESSURE DEVICE
Filed Feb. 11, 1946    2 Sheets-Sheet 2
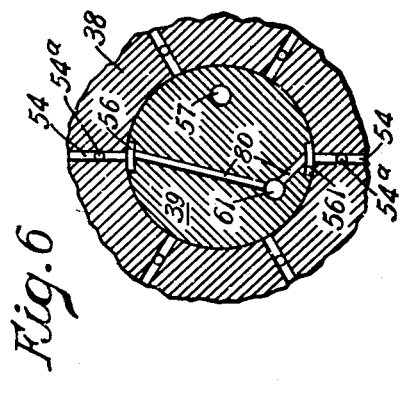
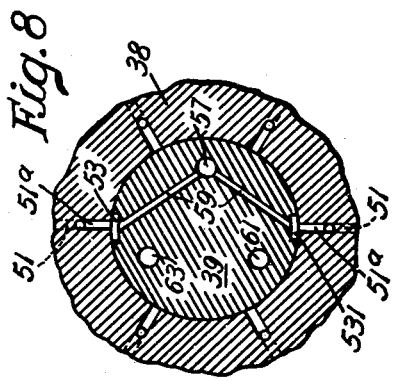
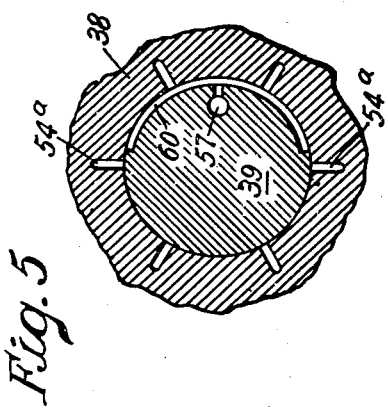
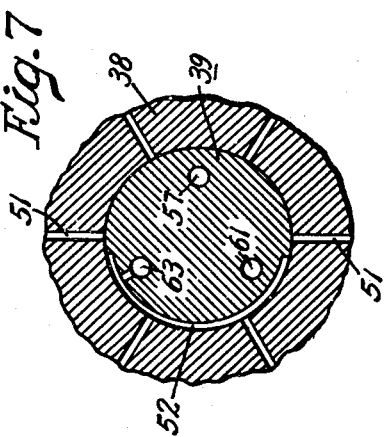
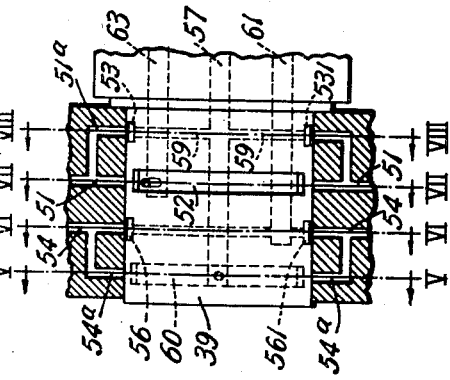
INVENTOR.
J. L. LEFLER
J. E. LEININGER
BY
E. W. Woodbury
ATTORNEY Patented Oct. 25, 1949

2,485,753

UNITED STATES PATENT OFFICE 2,485,753

FLUID PRESSURE DEVICE

James L. Lefler, North Hollywood, and James E. Leininger, Burbank, Calif., assignors to Bendix Aviation Corporation, South Bend, Ind., a corporation of Delaware Application February 11, 1946, Serial No. 646,838

6 Claims. (Cl. 103—5)

This invention relates to devices for pumping fluid under pressure and is particularly useful for supplying pressure fluid in high pressure hydraulic systems, although it is not limited to such use.

An object of the invention is to eliminate high bearing forces in devices for supplying fluid at high pressure.

Another object is to provide a mechanism for continuously converting or transforming a flow of fluid at one pressure into a flow of fluid at a different pressure without transferring the force equivalent of the pressure fluid through moving bearings.

Another object is to provide a practical mechanism for converting a large flow of fluid at low pressure into a smaller flow at a high pressure or vice versa.

Another object is to provide a rotary hydraulic machine of the radial cylinder type for receiving fluid at one pressure and delivering fluid at a different pressure, in which the radial hydraulic forces are substantially balanced, whereby low bearing forces are realized.

Other more specific objects and features of the invention will become apparent from the detailed description to follow of a particular embodiment of the invention.

Referring to the drawing:

Fig. 4 is a detail longitudinal section taken in the same plane as Fig. 1; and

Figs. 5, 6, 7, and 8 are detail cross-sections taken in the planes V—V, VI—VI, VII—VII, and VIII—VIII, respectively, of Fig. 4.

Figure 1:
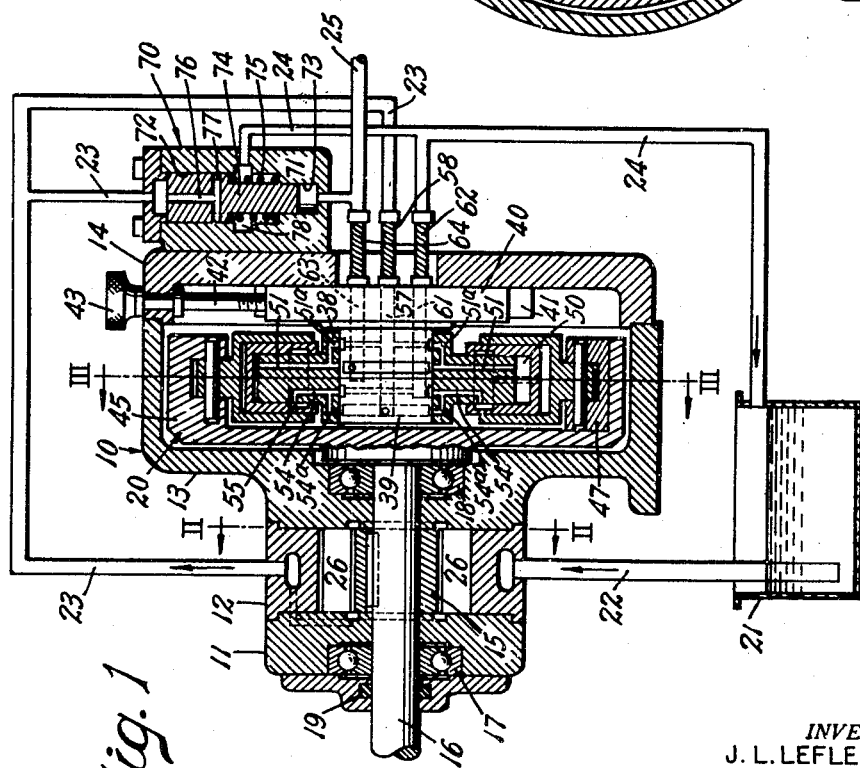
Fig. 1 is a longitudinal section through a machine in accordance with the invention.

Referring to Fig. 1 the apparatus therein disclosed comprises a casing 10 which is shown formed in four sections, 11, 12, 13, and 14 respectively, to facilitate assembly and disassembly. The sections 11, 12, and 13 define the housing of a rotary vane pump having a rotor 15 which is keyed to a drive saft 16, the latter being supported by ball bearings 17 and 18 mounted in the housing sections 11 and 13 respectively. At its left end, the shaft 16 extends through a seal 19 and is adapted to be connected to a drive pulley or motor. At its right end, the shaft 16 is connected to an annular frame member 20 contained within the housing sections 13 and 14.

In operation, the vane pump constitutes a primary pump which draws fluid from a reservoir 21 through an intake pipe 22 and delivers it through a pressure fluid supply conduit 23 to a booster mechanism positioned within the annular frame member 20. This booster mechanism returns part of the fluid entering through the supply conduit 23 through an exhaust conduit 24 back to the reservoir 21 and raises the pressure of the remainder of the fluid and delivers it to a pressure fluid delivery conduit 25.

Figure 2:
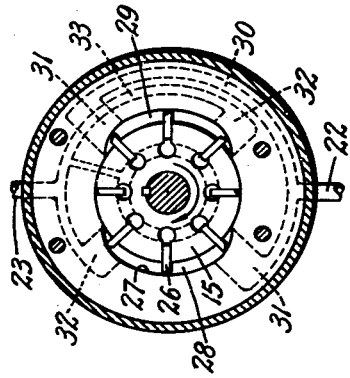
Fig. 2 is a cross-section taken in the plane II—II of Fig. 1.

The primary pump is of conventional form having vanes 26 (Fig. 2) slidable in radial slots in the rotor 15, which vanes seal with the side walls defined by the casing members 11 and 13 and seal with a peripheral wall 27 defined by the casing member 12. The peripheral wall 27 is of generally oval shape defining, with the peripheral surface of the rotor 15, two pockets 28 and 29 through which the vanes 26 force fluid in response to rotation of the rotor 15. The rotor is designed for clockwise rotation as viewed in Fig. 2, and as the vanes 26 sweep through the pockets 28 and 29, they draw in fluid through the suction pipe 22, a manifold 30 and intake ports 31, and discharge it through discharge ports 32 and a discharge manifold 33 to a low pressure fluid supply conduit 23. The primary pump as described is of conventional construction and of itself does not constitute a new invention.

Figure 3:
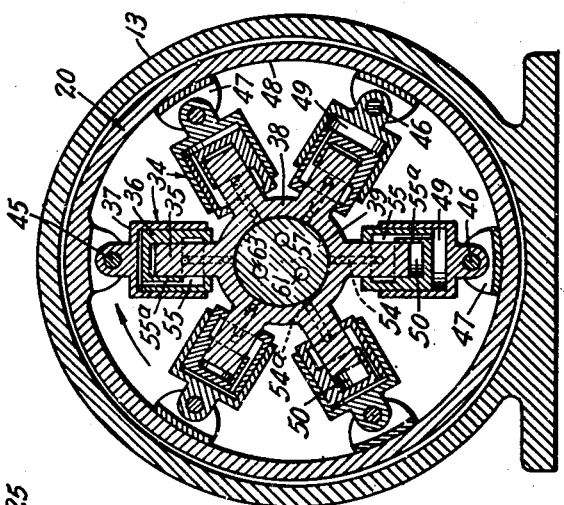
Fig. 3 is a cross-section taken in the plane III—III of Fig. 2.

Referring now to the pressure boosting portion of the apparatus, there are mounted within the annular frame member 20, a plurality of spoke assemblies 34, six in number as shown in Fig. 3. All of the spoke assemblies 34 are identical, each consisting of a piston element 35, a floating element 36, and a cylinder element 37. As shown, all of the piston elements 35 are formed integrally with each other and with a common bearing member 38 which is rotatably supported on a journal 39. The journal 39 is normally stationary, and, as shown, is formed integrally with a supporting block 40, which is slidably mounted for radial movement between guides 41 on the inner surface of the casing member 14, and is radially supported by an adjusting screw 42 which extends through a hole provided therefor in the casing member 14. Screw 42 has a handle 43 secured thereto exterior of the casing, and by rotating this handle the block 40 and the journal 39 can be shifted into a desired position of eccentricity with respect to the axis of rotation of the annular frame member 20 and its driving shaft 16.

The annular frame member 20 and the bearing member 38 rotate in unison by virtue of the fact that the outer end of one of the cylinder elements 37 is pivotally connected to the frame member by a pivot pin 45. The remaining five cylinder elements 37 are pivotably connected at their outer ends by pins 46 to shoes 47 which have curved outer surfaces adapted to lie against the inner surface 48 of the annular frame member and provide a large bearing surface therewith. During operation, there is always some pressure fluid within each of the spoke assemblies 34, tending to expand them, so that the shoes 47 are held against the surface 48 of the annular frame member.

It will be apparent that since the journal 39 is eccentrically disposed with respect to the axis of the annular frame member 20, rotation of the latter will permit each of the spoke assemblies 34 to expand during movement through one half revolution and will force it to contract during the other half revolution. Referring to Fig. 3, the spoke assemblies expand during rotation from a position corresponding to 12 o'clock into the position corresponding to 6 o'clock, and contract during rotation from the 6 o'clock position back to the 12 o'clock position.

Expansion and contraction of each spoke assembly is accommodated either by relative movement between the piston element 35 and the floating element 36, or between the floating element 36 and the cylinder element 37.

Each cylinder element 37 defines with its associated floating element 36 a large expansible and contractable chamber 49, and each floating element 36 defines with its associated piston element 35 a small expansible and contractable chamber 50.

Valve means and passage means are provided for admitting and exhausting fluid to and from the chambers 49 and 50 as follows: Each piston element 35 has a passage 51 (Fig. 1), extending longitudinally therethrough and defining at its inner end a port in the bearing surface of the bearing member 38, which communicates with a port 52 (Fig. 7) in the surface of the journal 39 in certain positions of rotation of the bearing member. Each passage 51 (Fig. 4) also has a branch passage 51a, which defines at its inner end another port in the bearing surface of the bearing member 38, which communicates with journal ports 53 and 53I (Fig. 8) in certain positions of rotation of the apparatus. Each piston element 35 is also provided with a passage 54 (Fig. 1), which extends from the inner surface of the bearing member 38 to the peripheral wall of the piston element 35 and registers with an annular recess 55 in the inner surface of the associated floating element 36 in all positions of the latter with respect to the piston element 35. Each annular recess 55 is communicated by a passage 55a (Fig. 3) with the associated chamber 49. The inner end of each passage 54 constitutes a port in the inner surface of the bearing member 38 which is adapted to register with ports 56 and 56I (Fig. 6) in the journal member 39 in certain positions of rotation of the bearing member 38. Each passage 54 also has a branch passage 54a (Fig. 1), the inner end of which constitutes a port in the bearing surface of the bearing member 38, which is adapted to register with a port 60 (Fig. 5) in the journal member 39 in certain positions of rotation of the apparatus.

As clearly shown in Fig. 4, the various ports at the inner ends of the passages 54a, 54, 51, and 51a respectively, are spaced longitudinally with respect to each other so that the passages 54a connect only with the journal port 60; the passages 54 connect only with the journal ports 56 and 56I; the passages 51 connect only with the journal port 52; and the passages 51a connect only with the journal ports 53 and 53I.

The journal port 60 (Fig. 5) is connected by a longitudinal passage 57 in the journal 39 and a flexible hose connection 58 (Fig. 1) to the low pressure fluid supply conduit 23. The journal ports 53 and 53I (Fig. 8) are also connected to the passage 57 by passages 59. The journal ports 56 and 56I are connected by passages 80 and a longitudinal passage 61 in the journal 39, and by a flexible hose connection 62 to the exhaust conduit 24. The journal port 52 is connected by a longitudinal journal passage 63 and a hose connection 64 to the high pressure fluid delivery conduit 25.

The operation of the apparatus may be traced as follows:

Assume that the shaft 16 is being rotated, causing the vane pump to draw fluid from the reservoir 21 and deliver it to the low pressure fluid supply conduit 23 at a rate determined by the capacity of the pump. This fluid flows through the conduit 23, the hose connection 58, and the journal passage 57 to the journal port 60 (Fig. 5). The piston passages 54a of the spoke assemblies in the positions corresponding to 2 o'clock and 4 o'clock are at this time connected to the journal port 60, so that fluid flows through the passages 54a, 54, 55, and 55a to the large chambers 49 of those assemblies, causing the floating elements 36 to remain in their inner-most positions against the piston elements 35 and expanding the large chambers 49 with fluid from the supply conduit 23, as the associated spoke assemblies move away from the 12 o'clock toward the 6 o'clock position.

Slightly before each spoke assembly reaches the 6 o'clock position, its passage 54a (Fig. 5) is cut off from the port 60 and the passage 54 (Fig. 6) is connected to the journal port 56I, which is connected to the exhaust conduit 24. At the same time, the inner end of the passage 51a (Fig. 8) registers with the port 53I connected with the low pressure supply conduit 23. Therefore, during movement of each spoke assembly past the 6 o'clock position, the fluid in its large chamber 49 (Fig. 3) is exhausted through the passages 55a, recess 55, and passage 54, and fluid is admitted from the low pressure supply conduit into the small chamber 50 from journal port 53I and passage 51a, so that after each spoke assembly has passed the 6 o'clock position, it floating element 36 has been moved downwardly, contracting the large variable chamber 49 and expanding the small variable chamber 50, which is filled with fluid at the pressure of the low pressure supply conduit 23.

During movement of each spoke assembly from slightly past the 6 o'clock position to near the 12 o'clock position, its piston element 35 is moved into its associated floating element 36 because of the eccentric positioning of the journal 39, and the fluid in the small chamber 50 is forced through the passage 51 (Fig. 7), through the journal port 52, the journal passage 63 and the flexible hose connection 64 (Fig. 1) to the pressure fluid delivery conduit 25.

It will be apparent, therefore, that while a relatively large volume of fluid is entering the large chambers 49 from the supply conduit 23 during movement of spoke assemblies between the 12 o'clock position and the 6 o'clock position, a smaller volume of fluid is being displaced from the small chambers 50 into the delivery conduit 25 during movement of other spoke assemblies from the 6 o'clock position to the 12 o'clock position.

A major feature of the invention is the balancing of the forces developed in diametrically opposite spoke assemblies, so that low bearing forces are maintained between the journal 39 and the bearing member 38. In order to obtain such a balance, the ratio of the pressure in the low pressure supply conduit 23 to the pressure in the high pressure delivery conduit 25 should be the same as the ratio of the area of the piston elements 35 to the area of the cylinder elements 37. Thus if the area of the cylinder elements 37 is three times the area of the piston elements 35, the pressure in the delivery conduit 25 should be three times the pressure in the supply conduit 23. This desired ratio can be maintained by designing the vane pump to deliver a slightly greater flow than the booster pump can handle and providing a pressure balancing valve 70 which will by-pass sufficient fluid from the supply conduit 23 to maintain the pressure therein at the desired ratio with respect to the pressure in the delivery conduit 25. This balancing valve 70 comprises a cylinder block 71 having a large bore 72 and a small bore 73, the areas of which have the same ratio as the areas of the cylinder element 37 and the piston elements 35 respectively. A single piston element 74 has a large portion fitted in the cylinder bore 72 and a small portion fitted in the cylinder bore 73. The outer end of the cylinder bore 72 is connected to the conduit 23, and the outer end of the small cylinder bore 73 is connected to the conduit 25. When the pressures in the conduits 23 and 25, respectively, have the desired ratio, the forces exerted by the fluids in these two conduits on the piston 74 are equal and opposite, and the piston is maintained in its upper position by a light retaining spring 75. However, whenever the pressure in the supply conduit 23 rises above its intended value with respect to the pressure in the delivery conduit 25, the piston 74 is moved downwardly to permit fluid to be discharged from the supply conduit 23 through a passage 76 and ports 77 in the piston 74, into the exhaust conduit 24.

As an example, let it be assumed that the ratio of the area of each piston element 35 to the area of each cylinder element 37 is three to one, and that the ratio of the area of the bore 72 to the area of the bore 73 of the balancing valve is likewise three to one. Therefore, if the resistance to flow of fluid through the delivery conduit 25 is such as to create a pressure of 3000 p. s. i., the pressure in the supply conduit 23 will be maintained at 1000 p. s. i. by the balancing valve 70. It follows that the pressure in the large chambers 49 of the spoke assemblies during movement from the 12 o'clock position to the 6 o'clock position will be 1000 p. s. i., and the pressure in the small chambers 50 of the spoke assemblies between the 6 o'clock and 12 o'clock positions will be 3000 p. s. i. However, a pressure of 3000 p. s. i. acting on the piston element 35 will develop a force on the bearing member 38 that is equal and opposite to the force developed by fluid at 1000 p. s. i. in the large chamber 49 of the diametrical opposite spoke assembly. Therefore, only small bearing forces will be developed between the journal 39 and the bearing member 38, minimizing the frictional resistance to rotation, and greatly reducing wear.

During movement of each spoke assembly past the 6 o'clock position and simultaneous movement of the opposite spoke assembly past the 12 o'clock position, the large chambers 49 of both assemblies are connected to exhaust, and the small chambers 50 of both assemblies are connected to the low pressure supply conduit 23. Therefore approximate balance of force is obtained during movement through these positions.

Although it is convenient to mount the booster assembly, including the annular frame member 20, on the same shaft with the primary pump so that the annular frame member is positively rotated with the primary pump, it is not essential to do so. If desired, any external pump can be used to supply pressure to the supply conduit 23, and the annular frame member 20 and bearing member 38 can be left free to rotate in response to the forces developed in the different spoke assemblies. Obviously under such conditions the pressure in the supply conduit 23 should bear a ratio in the delivery conduit 25 slightly less than the ratio of the area of the piston elements 35 to the area of the cylinder elements 37 in order to provide an unbalanced component capable of producing the necessary rotation of the annular frame member 20. The latter will then rotate at whatever speed is necessary to handle the flow through the supply conduit 23. This speed of rotation can be varied between limits by adjusting the eccentricity of the journal 39 by means of the adjusting screw 42. The greater the eccentricity of the journal 39 the less can be the speed of rotation of the annular frame member 20 in order to handle a given flow of fluid.

Obviously the operation of the system requires only relative rotation between the journal 39 and the annular frame member 20 about the axis of the latter, and it may sometimes be desirable to rotate the journal 39 instead of the annular frame member 20, although this complicates the structure for conducting fluid to and from the journal.

Various other departures from the exact construction shown and described will be apparent to those skilled in the art and the invention is therefore to be limited only to the extent set forth in the appended claims.

We claim:

1. Apparatus of the type described comprising: an annular frame member; a bearing member within and having its axis parallel to the axis of said frame member; a plurality of spoke assemblies approximately radially disposed with respect to said bearing member; each of said spoke assemblies comprising a cylinder element radially supported by one of said members, a piston element radially supported by the other member, and a radially floating element interconnecting and sealing with said cylinder and said piston elements, each floating element defining with its associated cylinder element a first variable chamber of large diameter and defining with its associated piston element a second variable chamber of smaller diameter; a journal for said bearing member eccentrically disposed with respect to said frame member, whereby each spoke assembly expands during one half revolution and contracts during the other half revolution in response to relative rotation between said journal and said bearing member; a pressure fluid supply conduit; a pressure fluid delivery conduit; an exhaust conduit; valve means actuated in response to relative rotation between said bearing member and said journal for connecting said first chamber of each spoke assembly to said supply conduit during a first arc of movement while that assembly is expanding, connecting said second chamber to said delivery conduit during a second arc of movement while the associated assembly is contracting, and connecting said second chamber to said supply conduit and connecting said first chamber to said exhaust conduit during movement of the associated assembly between said first and second arcs; whereby said supply conduit pressure fluid in said first chambers during expansion thereof produces a force aiding said relative rotation, said delivery conduit pressure in said second chambers during contraction thereof produces a force opposing said relative rotation, and the force aiding rotation prevails over the force opposing rotation when the supply conduit pressure exceeds a predetermined fraction of the delivery conduit pressure, said fraction being the ratio of the area of said second chambers during expansion thereof to the area of said first chambers during contraction thereof, and said rotation is maintained by said supply conduit pressure fluid when its pressure exceeds said predetermined fraction of the delivery conduit pressure by an amount sufficient to overcome the frictional resistance to rotation.

2. Apparatus as described in claim 1 in which said journal is normally stationary and said bearing member, frame member, and spoke assemblies are rotatable.

3. Apparatus as described in claim 1 including supporting means movable in a radial path for supporting said journal and means for radially adjusting said supporting member to vary the eccentricity of said journal and bearing member relative to said frame member.

4. Apparatus as described in claim 1 in which said valve means includes ports in said journal connected to said conduits and ports in said bearing member connected to said chambers and adapted to register with predetermined ones of said ports in said journal in predetermined positions of relative rotation between said journal and bearing member.

5. Apparatus as described in claim 1 including pressure balancing valve means connected to said conduits and responsive to increase of the pressure in said supply conduit above a predetermined ratio with respect to the pressure in said delivery conduit for venting said supply conduit to said exhaust conduit.

6. Apparatus as described in claim 1 including a drive shaft connected to one of said members for rotation therewith; and means supporting said drive shaft for rotation about the axis of said frame member.

JAMES L. LEFLER.
JAMES E. LEININGER.

REFERENCES CITED

The following references are of record in the file of this patent:

UNITED STATES PATENTS

| Number | Name | Date |
| --- | --- | --- |
| 1,971,601 | Dilg | Aug. 28, 1934 |